H. T. Love.
Drill-Bit.

No. 3142 Reissued Sept. 29, 1868

Witnesses
E. M. McKean
P. S. Dodge

Inventor
H. W. Greer &
R. H. Boyd,
By Smith & Dodge
Their Attorneys.

United States Patent Office.

HORACE T. LOVE, OF NEW YORK, N. Y., ASSIGNEE OF WILLIAM W. GRIER AND ROBERT H. BOYD.

*Letters Patent No.* 47,812, *dated May* 23, 1865; *reissue No.* 3,142, *dated September* 29, 1868.

IMPROVED DRILL-BIT.

The Schedule referred to in these Letters Patent and making part of the same.

TO WHOM IT MAY CONCERN:

Be it known that WILLIAM W. GRIER and ROBERT H. BOYD, of Hulton, in the county of Allegheny, and State of Pennsylvania, have invented a new and improved Drill-Auger or Bit, for boring and drilling coal, iron, stone, and similar purposes, and have assigned their entire right, title, and interest in and to the same to HORACE T. LOVE, of the city, county, and State of New York, his heirs and assigns. Now, therefore, I, the said HORACE T. LOVE, assignee, as aforesaid, do declare that the following is a full, clear, and exact description of the same, reference being had to the accompanying drawings, making a part of this specification, wherein—

Figure 3:
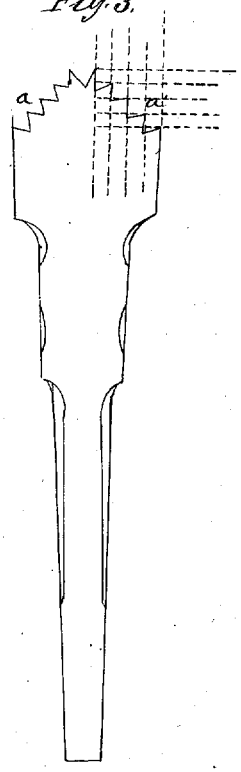
Figure 3 is a similar view, showing the tool armed with diamonds, carbons, or other hard cutting-points, and indicating, by red lines, the relation which these points sustain to the axial line of the tool, and also the relation which these points sustain to each other.

In order to enable others skilled in the art to make and practise this invention, I will explain its construction, as shown in fig. 3.

The drill or drill-bit is made in the form shown in fig. 3, in which *a* represents the cutting-points, which are either of hard metal, carbons, or diamonds, and *a'*, red lines, showing the position and shape of the cutting-points, relatively with the axial line of the bit and right lines thereto. The cutting-points *a* should be as hard as possible, not to be brittle and break. Hardened steel or other metal may answer for coal and the softer stones, but carbons or diamonds for rock, particularly if hard, are greatly to be preferred.

The hard cutting-points *a*, either single or in pairs, are arranged or set at different radial distances in relation to the axial line of the tool, the two foremost on different sides thereof, with a recess, space, or notch between their extreme points, while the remaining points, by recurring to the red lines *a'*, which are designed to be drawn respectively at right angles to and parallel with said axial line, will be seen to have their extreme ends "dip," forming an acute angle at the cutting-point, which is advanced further forward than the base of the preceding point in its outer line, and in their relation to each other to cut concentric parallel grooves, leaving intermediate lands to be chipped or ground out, or otherwise removed by the wedge-like points or edges, as the tool is fed forward in operation.

This disposition of the cutting-edges is important to the invention, and cannot be overestimated.

The bottom of the hole bored, conforming to the shape of the forward end or face of the tool, will have a slight elevation kept cut to a uniform size, whose apex will correspond to the axial line of the drill, and will act to lead, guide, or conduct the tool in a straight line as it penetrates when in operation. The concentric grooves, cut with intermediate lands, also serve precisely the same purpose, while the chipping out of these intermediate lands, as the tool is fed forward, as aforesaid, serves to make it bore more expeditiously.

This tool, designed originally to intercut a collateral hole to channel, would be of little value in the absence of devices for boring rapidly and straight, which is perfectly done by this construction of drill or drill-bit.

No importance, except convenience of construction or setting, is attached to arranging the cutting-points in longitudinal lines, as shown in fig. 3. They may be set so, or otherwise, only that they are respectively so arranged in their radial relation to the axial line, as aforesaid, that they remove the entire lands and surface embraced within the circle described by the outermost edges, which outermost edges determine the greatest diameter of the holes bored.

And no particular importance is attached to the shape of the body or head of the bit. It may be made round or flattened, longer or shorter, thicker or thinner, with or without screw-shank for attachment, square-shanked or otherwise, and the face may be oval, sharp, angular, or otherwise, such being mere mechanical details, well known, and may be varied, as desired, according to the various positions and conditions wherein it is to be used.

Figure 1:
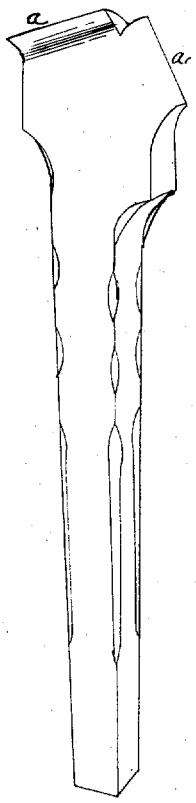
Figure 1 is an isometrical perspective view of a drill-auger or auger-bit, showing particularly the notch or recess at its central point
Figure 2:
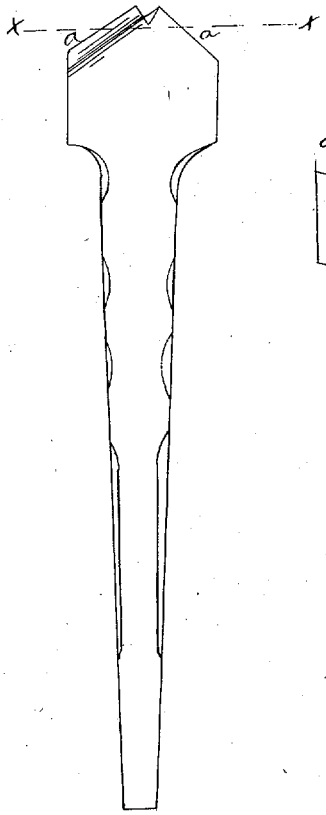
Figure 2 is a side view of the same.
Figure 4:
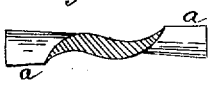
Figure 4 shows a transverse section of fig. 2.

While I have shown, in figs. 1, 2, and 4, another form of a drill or drill-bit, such form or construction I do not claim, as I prefer that shown in fig. 3, the cutting-edges of which are diamonds or other hard cutting-substances, and project forward of the base of the preceding point.

What I claim as the invention of GRIER and BOYD, and desire to secure by Letters Patent, is—

A rotating drill or drill-bit, whose edges of diamonds, or other hard cutting-points, are separated at its forward end by a recess or notch, and are arranged with relation to the axial line of the tool and each other, substantially in the manner and for the purpose described.

HORACE T. LOVE.

Witnesses:

EUGENE SMITH,

GEO. W. FOX.